United States Patent
Culek et al.

(10) Patent No.: US 12,319,294 B2
(45) Date of Patent: Jun. 3, 2025

(54) TIME-BASED ARTIFICIAL ROAD FRICTION LEARNING METHOD AND SYSTEM

(71) Applicant: Ford Global Technologies, LLC, Dearborn, MI (US)

(72) Inventors: Kyle Culek, Birmingham, MI (US); Jose Velazquez Alcantar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 18/450,608

(22) Filed: Aug. 16, 2023

(65) Prior Publication Data

US 2025/0058782 A1  Feb. 20, 2025

(51) Int. Cl.
*B60W 40/068* (2012.01)

(52) U.S. Cl.
CPC ....... *B60W 40/068* (2013.01); *B60W 2520/26* (2013.01); *B60W 2710/18* (2013.01); *B60W 2720/30* (2013.01)

(58) Field of Classification Search
None
See application file for complete search history.

(56) References Cited

U.S. PATENT DOCUMENTS

| | | | |
|---|---|---|---|
| 7,702,446 B2 | 4/2010 | Hiwatashi | |
| 8,315,758 B2 | 11/2012 | Takenaka et al. | |
| 8,914,213 B2 | 12/2014 | Chimner et al. | |
| 11,613,260 B2* | 3/2023 | Kobayashi | B60W 40/06 |
| | | | 73/146 |
| 2012/0191282 A1* | 7/2012 | Maki | B60K 6/52 |
| | | | 180/65.265 |
| 2014/0207355 A1* | 7/2014 | Akaho | B60L 3/108 |
| | | | 701/70 |
| 2018/0093565 A1* | 4/2018 | Kondo | B60K 23/0808 |

FOREIGN PATENT DOCUMENTS

DE   102019213442 A1   3/2021

* cited by examiner

*Primary Examiner* — Kyle T Johnson
*Assistant Examiner* — Arslan Azhar
(74) *Attorney, Agent, or Firm* — David Kelley; McCoy Russell LLP

(57) ABSTRACT

Methods and a system for estimating a coefficient of friction of a surface being traveled upon by a vehicle is disclosed. The methods and systems may be active when wheel slip is not present and while wheel slip is present. The coefficient of friction for the surface being traveled upon may be estimated as a function of time since a most recent wheel slip event.

16 Claims, 5 Drawing Sheets

TIME-BASED ARTIFICIAL ROAD FRICTION LEARNING METHOD AND SYSTEM

FIELD

The present description relates generally to estimating a coefficient of friction for a road surface that a vehicle is traveling upon.

BACKGROUND/SUMMARY

A vehicle may travel on a road and the vehicle's tires may be exposed to a range of surfaces with coefficients of friction that vary. For example, during some conditions, the tires may be in contact with ice. During other conditions the tires may be exposed to dry concrete and/or dry asphalt. The ability of the vehicle's tires to maintain contact with the varying surfaces without wheel slip being induced may be a function of the amount of torque that is delivered to the vehicle's driven tires and a coefficient of friction of the surface that the tire is in contact with. Therefore, to maintain vehicle stability and traction it may be desirable for a coefficient of friction of a surface that is being driven upon to be determined.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not constrained to implementations that solve any disadvantages noted above or in any part of this disclosure.

DETAILED DESCRIPTION

Figure 1:
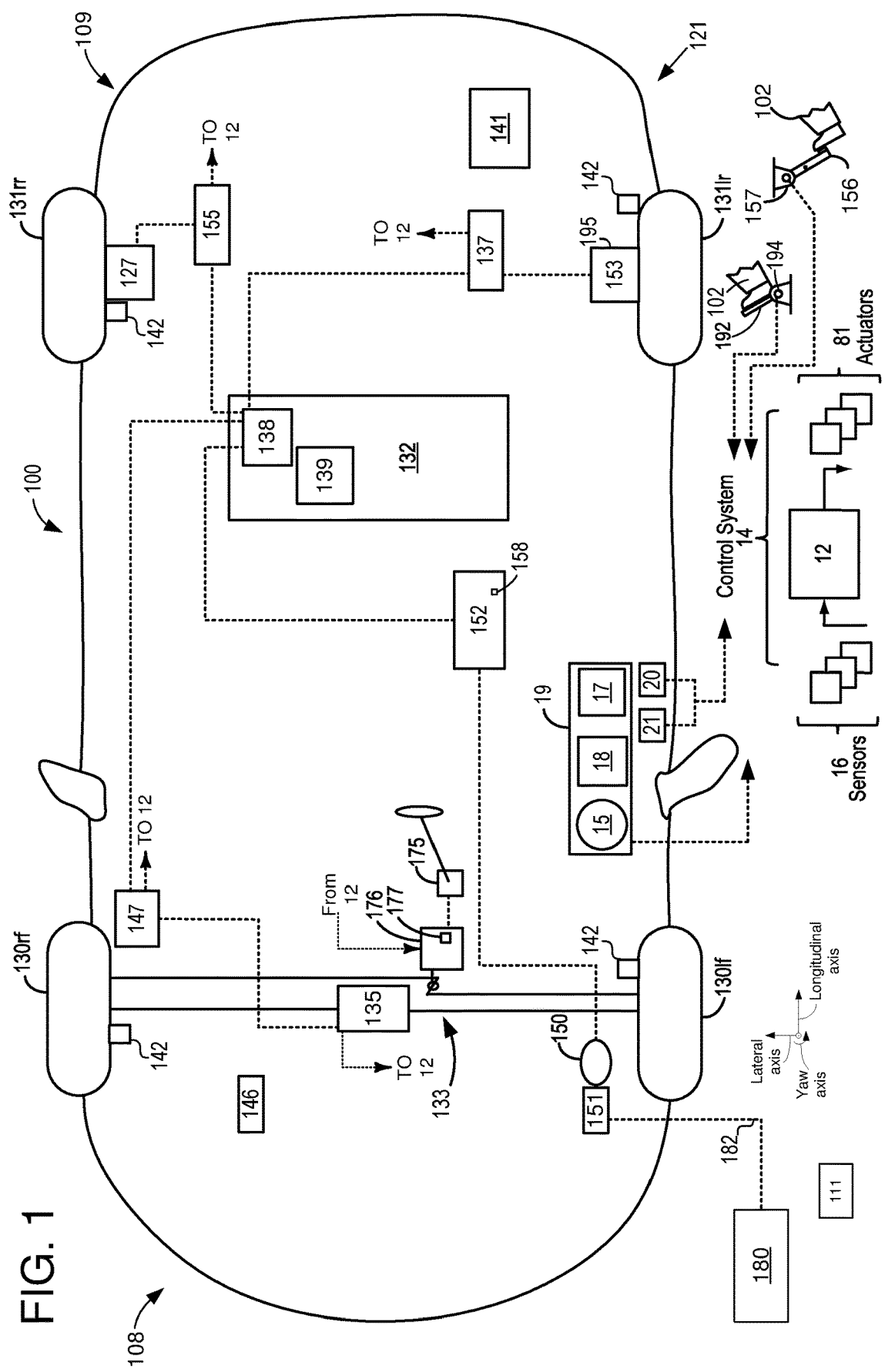
FIG. 1 is a schematic diagram of an example vehicle driveline.
Figure 3:
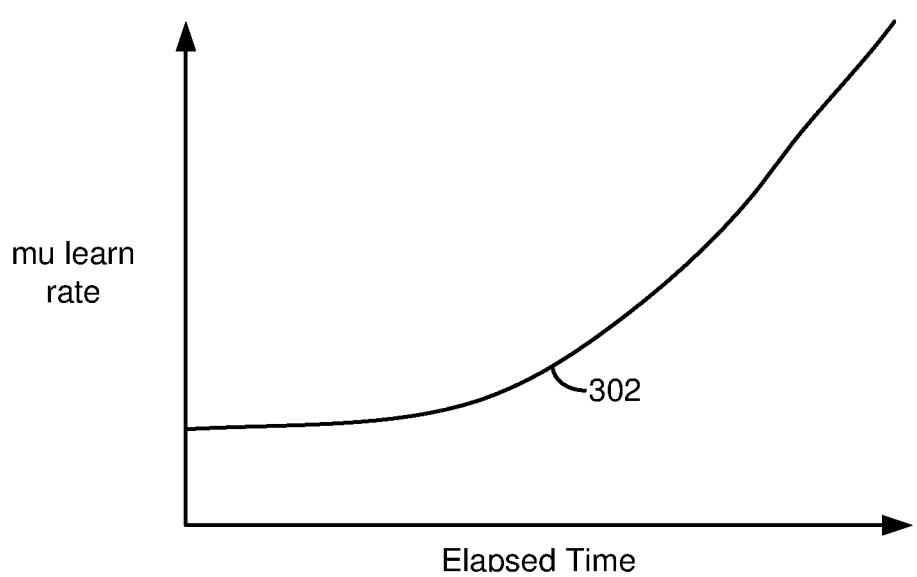
FIG. 3 shows a relationship between elapsed time since a most recent wheel and/or tire slip event and a coefficient of friction (mu) learning rate.
Figure 4:
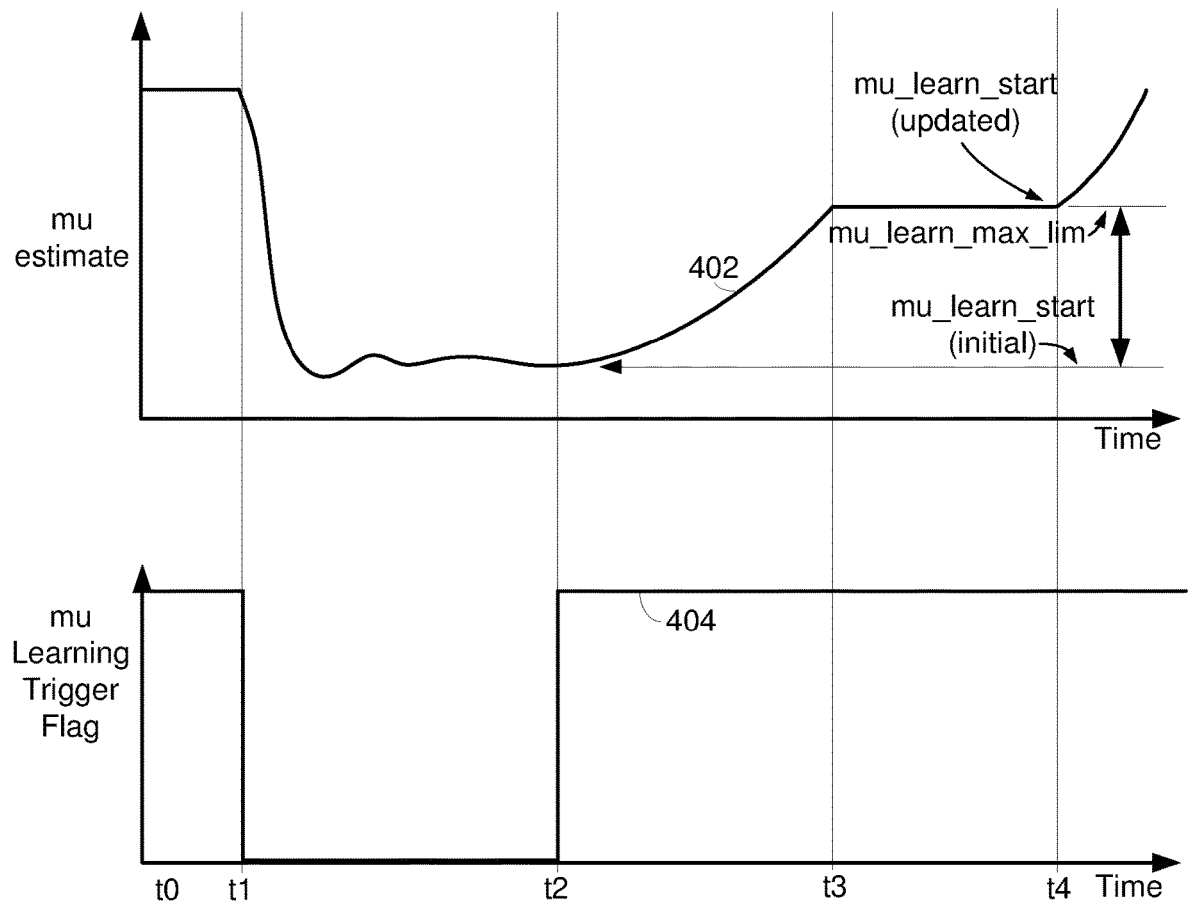
FIG. 4 shows a first coefficient of friction (mu) learning sequence according to the method of FIG. 2.
Figure 5:
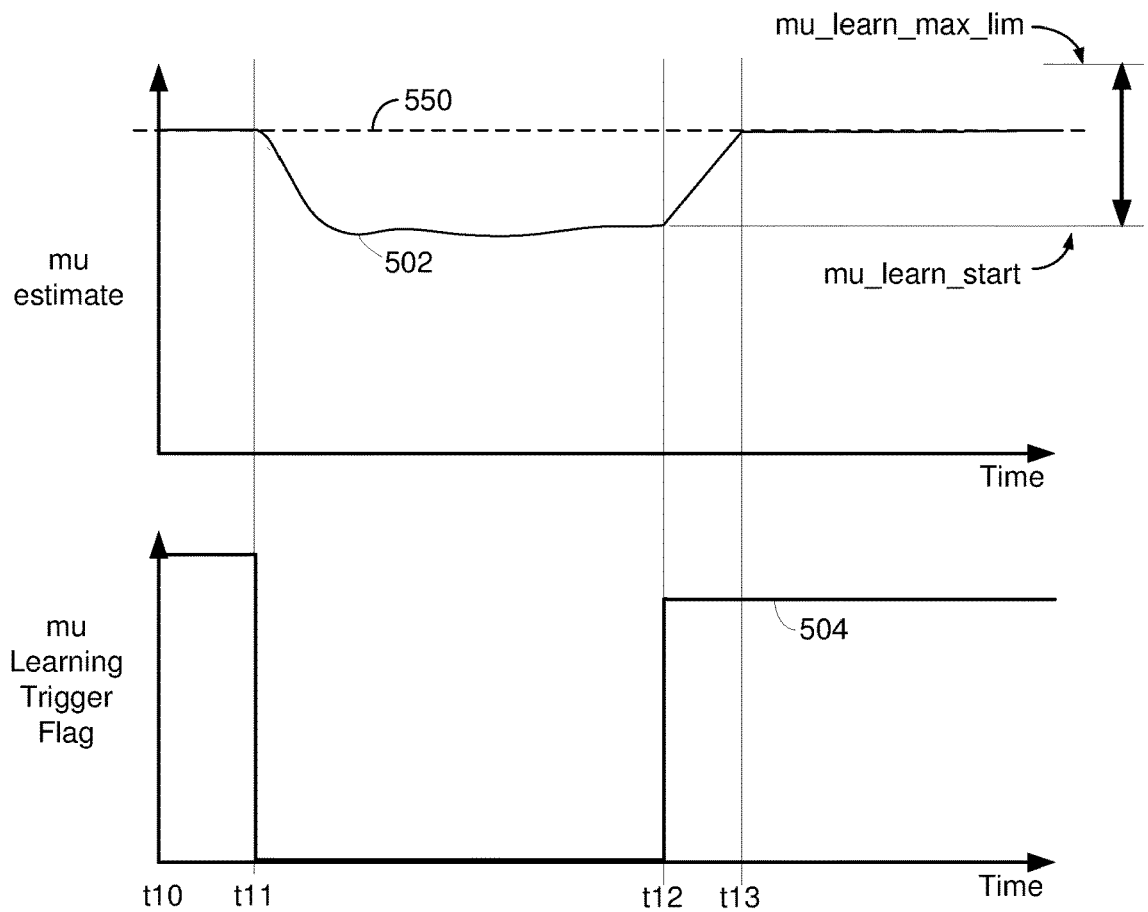
FIG. 5 shows a second coefficient of friction (mu) learning sequence according to the method of FIG. 2.
Figure 6:
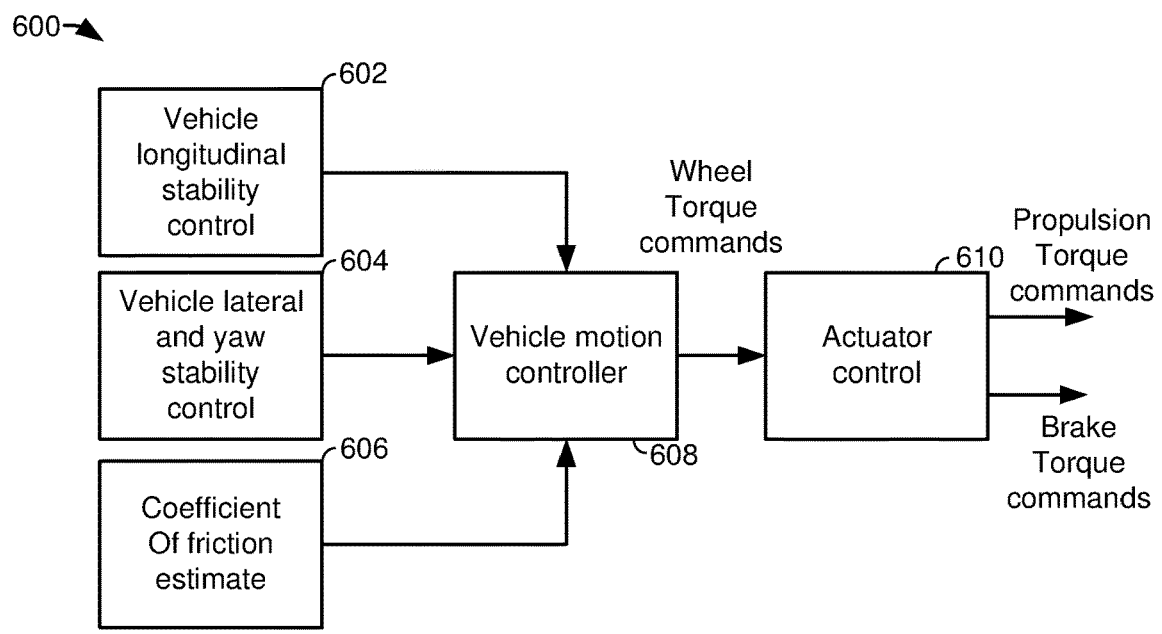
FIG. 6 shows a block diagram of a vehicle motion control system.

The following description relates to systems and methods for estimating and applying a coefficient of friction of a surface that is being traveled upon by a vehicle. The method and system estimate coefficient of friction (mu) while tires of the vehicle are not slipping and the learning takes place without the use or assistance of complex observers. The approach may be applied to an electric vehicle as shown in FIG. 1. Alternatively, the approach may be applied to hybrid vehicles and more conventional internal combustion propelled vehicles. The coefficient of friction (mu) estimation may be achieved according to the method that is represented by the flow chart of FIG. 2. The coefficient of friction (mu) estimation may be based on a mu learning rate that is a function of time as illustrated in FIG. 3. Example coefficient of friction (mu) learning sequences are shown in FIGS. 4 and 5. A block diagram of a vehicle motion controller that uses coefficient of friction estimates is shown in FIG. 6.

Past attempts to estimate a coefficient of friction (mu) for a surface being traveled upon have been attempted when a wheel is slipping. However, once there is no wheel slip, the process to estimate the coefficient of friction ceases, unless a complicated observer is utilized. In order to maintain vehicle traction and stability, it may be desirable to continuously estimate a coefficient of friction for a surface that is being traveled upon. By utilizing coefficients of friction that are frequently updated, including when wheel slip is not present, it may be possible to lower a possibility of wheel slippage and have more effective vehicle stability control. However, estimating coefficients of friction in the absence of wheel slip has not been achieved without implementing complex observers. Therefore, it may be desirable to provide a way of estimating a coefficient of friction for a surface that is being traveled upon when wheel slip is not present without utilizing observers.

The inventors herein have recognized the above-mentioned issues and have developed a method for estimating a coefficient of friction for a surface, comprising: via a controller, adjusting an estimated coefficient of friction for a surface being traveled upon by a tire in response to an absence of wheel slip, where the adjusting is based on an amount of time since a wheel most recently ceased slipping.

By generating a coefficient of friction for a surface that is being traveled upon by a vehicle when a wheel is not slipping, it may be possible to generate a coefficient of friction without constructing a complicated observer. Further, coefficients of friction may be estimated without an extensive calibration procedure.

The present description may provide several advantages. In particular, the approach may provide continuous estimates for coefficients of friction of a surface that is being traveled upon. In addition, the approach may be much simpler to calibrate and implement relative to other approaches. Further, the approach may be implemented without additional sensors and/or actuators.

FIG. 1 illustrates an example vehicle propulsion system 100 for vehicle 121. In this example, vehicle propulsion system 100 includes three electric machines that may be applied to propel vehicle 121. Throughout the description of FIG. 1, mechanical connections between various components are illustrated as solid lines, whereas electric connections between various components are illustrated as dashed lines.

In this example, vehicle propulsion system 100 includes an electric machine 153 coupled to solely one a wheel, namely left rear wheel 131*lr*. Vehicle propulsion system 100 also includes a second electric machine 127 that is coupled solely to one wheel, namely right real wheel 131*rr*. Vehicle propulsion system 100 drives front axle 133 and front wheels 130*lf* and 130*rf* via third electric machine 135. Front axle 133 is positioned toward front 108 of vehicle 121 and electric machines 153 and 127 are positioned toward rear 109 of vehicle 121. Thus, vehicle propulsion system 100 may be propelled by between one and three electric machines.

Electric machine 135, electric machine 127, and electric machine 153 are controlled via controller 12. The controller 12 (e.g., a centralized integrated vehicle control module) receives signals from the various sensors shown in FIG. 1. In addition, controller 12 employs the actuators shown in FIG. 1 to adjust driveline operation based on the received signals and instructions stored in memory of controller 12.

Vehicle propulsion system 100 has a front axle 133 and independently controlled rear wheels 131*lr* and 131*rr*. Vehicle propulsion system 100 further includes front wheels 130*lf* and 130*rf*. In this example, front wheels 130*lf* and 130*rf* and/or rear wheels 131*lr* and 131*rr* may be driven via electric propulsion sources. Optionally, the vehicle may include an internal combustion engine (not shown) as a propulsion source. The front axle 133 is coupled to electric machine 135. Electric machine 135 is shown incorporated into front axle 133.

Electric machines 127, 153, and 135 may receive electrical power from onboard electric energy storage device 132. Furthermore, electric machines 127, 153, and 135 may provide a generator function to convert the vehicle's kinetic energy into electric energy, where the electric energy may be stored at electric energy storage device 132 for later use by the electric machine 127, 153, and/or 135. A first inverter system controller (ISC1) 137 may convert alternating current generated by electric machine 153 to direct current for storage at the electric energy storage device 132 and vice versa. First inverter system controller 137 may also convert direct current from electric energy storage device 132 into alternating current to power electric machine 153. A second inverter system controller (ISC2) 155 may convert alternating current generated by electric machine 127 to direct current for storage at the electric energy storage device 132 and vice versa. The second inverter system controller 155 may also convert alternating current generated by electric machine 127 to direct current for storage at the electric energy storage device 132 and vice versa. A third inverter system controller 147 may convert alternating current generated by electric machine 135 to direct current for storage at the electric energy storage device 132 and vice versa. Further, third inverter system controller 147 may convert direct current supplied by electric energy storage device 132 to power electric machine 135.

Electric energy storage device 132 may be a battery, capacitor, inductor, or other electric energy storage device. In some examples, electric energy storage device 132 may be configured to store electric energy that may be supplied to other electric loads residing on-board the vehicle (other than the motor), including cabin heating and air conditioning, vehicle starting, headlights, cabin audio and video systems, etc.

Control system 14 may communicate with one or more of electric machine 135, electric machine 153, electric machine 127, energy storage device 132, etc. Control system 14 may receive sensory feedback information from one or more of electric machine 135, electric machine 127, electric machine 153, energy storage device 132, etc. Further, control system 14 may send control signals to one or more of electric machine 135, electric machine 127, electric machine 153, energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Energy storage device 132 may periodically receive and/or deliver electric energy via external device 180 (e.g., a stationary power grid, power tool, refrigeration unit, etc.) residing external to the vehicle (e.g., not part of the vehicle). As a non-limiting example, vehicle propulsion system 100 may be configured as a plug-in electric vehicle, whereby electric energy may be supplied to energy storage device 132 from external device 180 via an electric energy transmission cable 182 and electric coupler 151. During a charging or discharging operation of energy storage device 132 via external device 180, electric energy transmission cable 182 may electrically couple energy storage device 132 and external device 180. In some examples, external device 180 may be connected at electric vehicle charging port 150.

In some examples, electric energy from external device 180 may be received by charger 152. For example, charger 152 may convert alternating current from external device 180 to direct current (DC), for storage at energy storage device 132. Further, charger 152 may be bi-directional so as to convert DC from electric energy storage device 132 to AC for supply to external device 180. Further, charger 152 may step down or up DC voltage supplied from external device 180 to charge energy storage device 132. Additionally, charger 152 may step up or step down DC voltage from energy storage device 132 supplied to external device 180. Charger 152 may accept single and/or three phase AC power. Charger 152 may be controlled via its own dedicated controller 158 that includes non-transitory memory, a processor, inputs/outputs, and random access memory.

While the vehicle propulsion system is operated to propel the vehicle, electric energy transmission cable 182 may be disconnected between external device 180 and energy storage device 132. Control system 14 may identify and/or control the amount of electric energy stored at the energy storage device 132, which may be referred to as the state of charge (SOC).

Energy storage device 132 may include an electric energy storage device controller 139. Electric energy storage device controller 139 may provide charge balancing between energy storage element (e.g., battery cells) and communication with other vehicle controllers (e.g., controller 12).

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21. Vehicle propulsion system 100 may also include a steering control system 176 that may adjust a steering angle via adjusting a position of steering motor 177.

Vehicle propulsion system 100 may further include a brake system control module (BSCM) 141 to apply and release friction wheel brakes 142. In some examples, BSCM 141 may comprise an anti-lock braking system to may maintain tractive contact with the road surface according to driver inputs while braking, which may thus prevent the wheels from locking up, to reduce a possibility of skidding. In some examples, BSCM 141 may receive input from wheel speed sensors 195.

Vehicle propulsion system 100 may further include a motor electronics coolant pump (MECP) 146. MECP 146 may be used to circulate coolant to diffuse heat generated by at least electric machine 127, electric machine 153, and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include driver demand pedal sensor 194, wheel speed sensor(s) 195, etc. In some examples, steering angle sensor 175, sensors associated with electric machine 135, electric machine 127, and electric machine 153, etc., may communicate information to controller 12, regarding various states of electric machine operation.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135, electric machine 127, and electric machine 153) based on an operator input. Various examples of the operator interface 15 may include interfaces that apply a physical apparatus, such as an active key, that may be inserted into the operator interface 15 to activate electric machines 135, 127, and 153, or may be removed to shut down the electric machines 135, 127, and 153 to turn off the vehicle. Still other examples may additionally or optionally use a start/stop button that is manually pressed by the operator to start or shut down the vehicle. In other examples, a remote vehicle start may be initiated remote computing device 111, for example a cellular telephone, or smartphone-based system where a user's cellular telephone sends data to a server and the server communicates with the vehicle controller 12 to start the vehicle.

Thus, the system of FIG. 1 provides for a system for estimating a coefficient of friction for a surface being traveled upon by a vehicle, comprising: a controller including executable instructions stored in non-transitory memory that cause the controller to adjust a coefficient of friction for a surface the vehicle is traveling on in response to an actual total amount of time since a most recent wheel slip event. In a first example, the system further comprises additional executable instructions that cause the controller to adjust the coefficient of friction in response to the most recent wheel slip event. In a second example that may include the first example, the system includes where the coefficient of friction is adjusted based on an actual wheel torque, a rate of wheel speed change, vehicle longitudinal rate of speed change, and vehicle lateral rate of speed change. In a third example that may include one or both of the first and second examples, the system further comprises additional executable instructions to adjust a wheel torque in response to the coefficient of friction. In a fourth example that may include one or more of the first through third examples, the system includes where the wheel torque is adjusted via adjusting output of a propulsion source. In a fifth example that may include one or more of the first through fourth examples, the system includes where the wheel torque is adjusted via adjusting a braking torque. In a sixth example that may include one or more of the first through fifth examples, the system includes where the coefficient of friction is increased at a predetermined rate.

Figure 2:
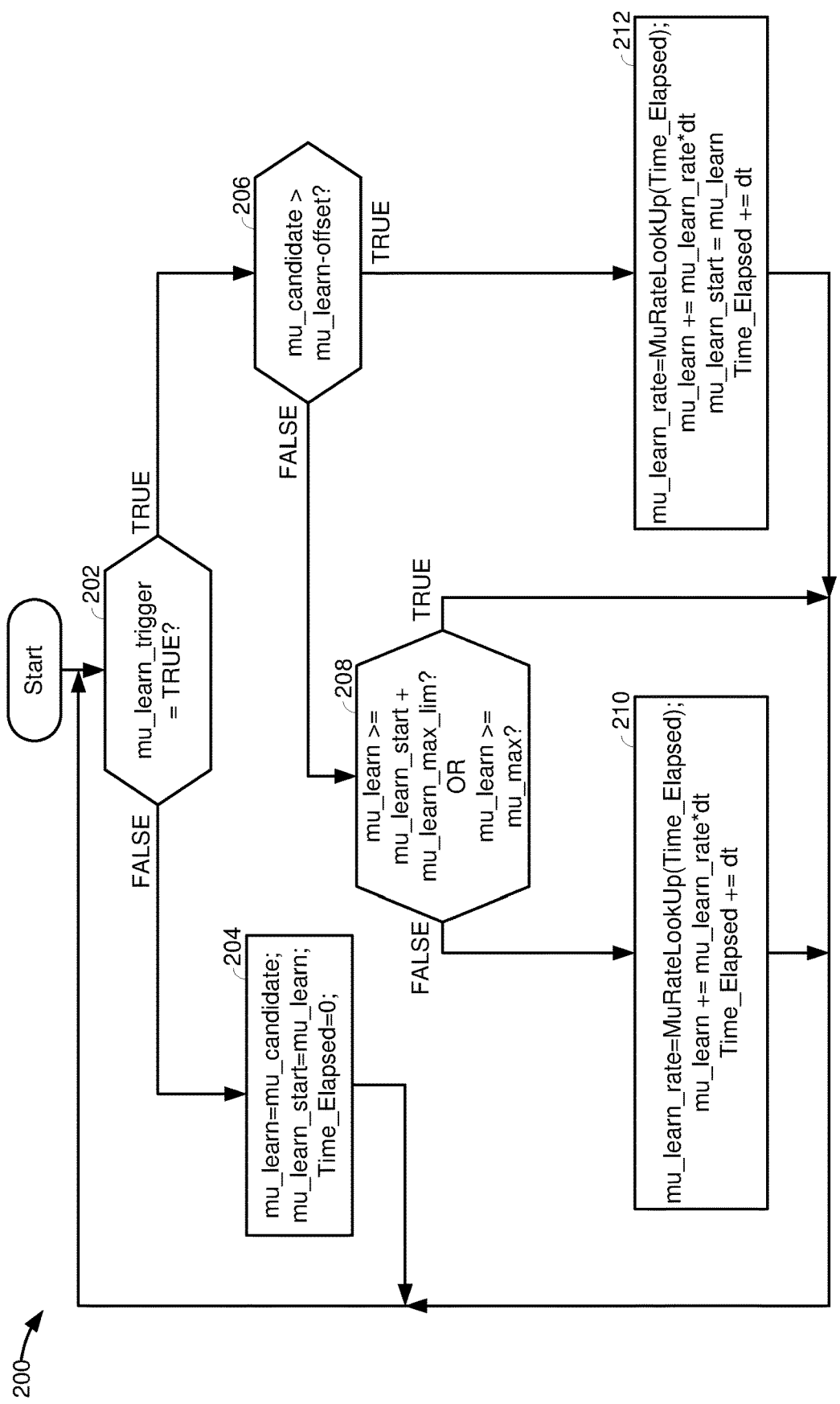
FIG. 2 shows a flow chart of a method for estimating and applying a coefficient of friction (mu) for a surface that is being driven upon by a vehicle.

Referring now to FIG. 2, a flow chart of an example method for estimating a coefficient of friction of a surface that a vehicle is traveling upon is shown. The method of FIG. 2 may be applied to each driven vehicle wheel (e.g., a wheel that is rotated via torque provided by way of a propulsion source) individually. The method of FIG. 2 may be incorporated into and may cooperate with the systems of FIG. 1. Further, at least portions of the method of FIG. 2 may be incorporated as executable instructions stored in non-transitory memory of one or more controllers shown herein.

At 202, method 200 judges whether or not a time based learning of a coefficient of friction for a surface that is being driven upon by a vehicle's tire is TRUE. In one example, the learning of the coefficient of friction for the surface being driven upon by the vehicle's tire may be triggered or activated in response to wheel slip not being present. Wheel slip may be defined as the relative motion between a wheel and the surface that the wheel's tire is rolling on. If triggering or activation of determining the time based coefficient of friction for a surface a tire is rolling upon is activated or triggered, the answer is TRUE and method 200 proceeds to 206. Otherwise, the answer is FALSE and method 200 proceeds to 204.

At 204, method 200, adjusts a learned or estimate coefficient of friction value (mu_learn) for the surface that the tire is rolling on to be equal to a value of mu_candidate. The value of mu_candidate may be determined via the following equation:

$$mu\_candidate = f(Awt, Awrate, Mass, Lonrate, Latrate, dt)$$

where mu_candidate is the estimated learned mu (coefficient of friction) for the surface that the wheel's tire is traveling on when the wheel is slipping, f is a function that returns the value of mu_candidate, Awt is the actual wheel torque or actual torque that is at the vehicle's wheel, Awrate is the actual wheel rate of speed change, Mass is a mass of the vehicle that the vehicle's center of gravity, Lonrate is the vehicle's longitudinal rate of speed change, Latrate is the vehicle's lateral rate of speed change, and dt is a time interval between algorithm executions. The value of mu_candidate may be continuously updated as the vehicle operates. Thus, when the wheel is slipping, the estimated coefficient of friction for the surface that the tire is traveling over is not estimated based on time, but rather on the previously mentioned variables.

Method 200 also adjusts the value of variable mu_learn_start, or the starting value of mu, to equal the estimated mu value (mu_learn_start=mu_learn). Method 200 also adjusts the amount of time since the most recent time that the wheel slipped (Time_Elasped) (e.g., for the wheel traveling over the surface for which the coefficient of friction is being estimated) to a value of zero. The learned coefficient of friction (mu_learn) and the mu_learn_start variable are set to the mu_candidate value because the estimated surface coefficient of friction (mu) value is valid when the wheel is spinning. When the wheel is not slipping, the mu_learn variable is artificially increased based on a calibrated lookup value as indicated at 210 and 212. Method 200 returns to 202.

At 206, method 200 judges whether or not the value of the variable mu_candidate is greater than or equal to the value of variable mu_learn−offset, where mu_candidate and mu_learn are as previously described and offset is a mu candidate offset variable. If method 200 judges that mu_candidate>=mu_learn−offset, the answer is TRUE and method 200 proceeds to 212. Otherwise, the answer is FALSE and method 200 proceeds to 208.

At 212, method 200 determines a learning rate for the value of mu. In particular, method 200 determines the learning rate for coefficient of friction (mu) according to the following equation:

mu_learn_rate=MuRateLookUp(Time_Elapsed)

where mu_learn_rate is the mu learning rate, MuRateLookUp is a table or function lookup that returns the value of mu_learn_rate based on the argument Time_Elapsed. FIG. 3 shows an example relationship that may be referenced via the MuRateLookUP function looked up. Method 200 also adjusts the value of mu_learn. The value of mu_learn is adjusted to mu_learn+=mu_learn_rate*dt, or mu_learn=mu_learn+mu_learn_rate*dt, where mu_learn and mu_learn_rate are as previously described and dt is the amount of time between execution cycles of method 200 or the amount of time between times when mu_learn is estimated. Method 200 also updates the value of mu_learn_start via the following equation: mu_learn_start=mu_learn so that the value of mu_learn starts where it last ended. Method 200 also revises the amount of elapsed time according to the following equation: Time_Elapsed=+=dt, or Time_Elapsed=Time_Elapsed+dt. In this way, the variable mu_learn will be incremented based on the rate that is determined from MuRateLookUP (e.g., the relationship of FIG. 3). Method 200 returns to 202.

At 208, method 200 judges whether or not the value of the variable mu_learn is greater than or equal to the value of variable mu_learn_start+mu_learn_max_lim OR if mu_learn is >=mu_max, where mu_learn and mu_learn_start are as previously described, mu_learn_max_lim is an offset value from the mu_learn_start value, OR is a logical or condition, and mu_max is a maximum value of mu (e.g., 0.95). If method 200 judges that mu_learn>=mu_learn_start+mu_learn_max_lim OR mu_learn>=mu_max, the answer is TRUE and method 200 returns to 202. Otherwise, the answer is FALSE and method 200 proceeds to 210. This logic allows mu_learn to incrementally increase until mu_learn is >=mu_learn_start+ mu_learn_max_lim OR mu_learn>=mu_max. Thus, method 200 may raise the value of mu_learn a threshold amount above the value of mu_candidate depending on vehicle operating conditions.

The value of mu_learn_max_lim may be dynamically adjusted according to vehicle operating conditions such that mu_learn_max_lim=g (vehicle operating mode, ambient temperature, vehicle geographical location, and broadcast weather reports), where g is a function that returns the value of mu_learn_max_lim; vehicle operating mode may be off road, sport, economy, etc.; vehicle geographical location may indicate surface grade, surface media (e.g., sand, gravel, etc.), etc.; and broadcast weather reports indicate raining, snowing, etc. at the vehicle's present location.

At 210, method 200 updates the learning rate for the value of mu. Method 200 determines the learning rate for mu as discussed at step 212. Method 200 also adjusts the value of mu_learn to mu_learn+=mu_learn_rate*dt, or mu_learn=mu_learn+mu_learn_rate*dt. In addition, method 200 also updates the amount of elapsed time according to the following equation: Time_Elapsed=+=dt, or Time_Elapsed=Time_Elapsed+dt. Method 200 returns to 202.

In this way, the coefficient of friction estimate for a wheel that is not slipping may be adjusted from a coefficient of friction that is adjusted from a coefficient of friction of the surface when the wheel most recently slipped. The coefficient of friction of the surface the wheel is traveling on is increased during conditions when the wheel is not slipping to estimate, via the prescribed method, the coefficient of friction for the surface that the wheel is traveling on.

Thus, the method of FIG. 2 provides for a method for estimating a coefficient of friction for a surface being traveled upon by a tire, comprising: via a controller, adjusting the coefficient of friction for the surface being traveled upon by the tire in response to an absence of wheel slip, where the adjusting is based on an amount of time since a wheel most recently ceased slipping. In a first example, the method for estimating the coefficient of friction for the surface further comprises adjusting wheel torque in response to the coefficient of friction. In a second example that may include the first example, the method for estimating the coefficient of friction for the surface includes where the adjusting is further based on a relationship between the amount of time since the wheel most recently ceased slipping and a predetermined coefficient of friction learning rate. In a third example that may include one or both of the first and second examples, the method for estimating the coefficient of friction for the surface includes where the relationship between the amount of time since the wheel most recently ceased slipping and the predetermined coefficient of friction learning rate is determined via calibratable (e.g., empirically determined values) or learned values. In a fourth example that may include one or more of the first through third examples, the method for estimating the coefficient of friction for the surface includes where adjusting the coefficient of friction includes adjusting the coefficient of friction from a value that is based on actual wheel torque, actual wheel rate of speed change, mass of a vehicle, a vehicle longitudinal rate of speed change, and a vehicle lateral rate of speed change. In a fifth example that may include one or more of the first through fourth examples, the method for estimating the coefficient of friction for the surface further comprises adjusting the coefficient of friction up to a value that is based on an offset value plus the value that is based on actual wheel torque, actual wheel rate of speed change, mass of the vehicle, the vehicle longitudinal rate of speed change, and the vehicle lateral rate of speed change. In a sixth example that may include one or more of the first through fifth examples, the method for estimating the coefficient of friction for the surface further comprises adjusting the coefficient of friction up to a maximum mu value. In a seventh example that may include one or more of the first through sixth examples, the method for estimating the coefficient of friction for the surface includes where the amount of time since the wheel most recently ceased slipping is a basis for a learning rate for the coefficient of friction.

The method of FIG. 2 also provides for a method for estimating a coefficient of friction for a surface, comprising: via a controller, adjusting an estimated coefficient of friction for a surface being traveled upon by a tire in response to a wheel slip; and adjusting the estimated coefficient of friction for the surface being traveled upon by the tire in response to an absence of wheel slip, where the estimated coefficient of friction for the surface being traveled upon by the tire is adjusted in response to the absence of wheel slip is adjusted based on an amount of time since a wheel most recently ceased slipping. In a first example, the method includes where the coefficient of friction for the surface being traveled upon by the tire in response to wheel slip is adjusted as a function of wheel torque, wheel rate of speed change, vehicle longitudinal rate of speed change, vehicle mass, time interval between routine execution cycles, and vehicle lateral rate of speed change. In a second example that may include the first example, the method further comprises adjusting torque output of a propulsion source in response to the estimated coefficient of friction. In a third example that may include one or both of the first and second examples, the method includes where the adjusting the estimated coefficient of friction for the surface being traveled upon by the tire in response to an absence of wheel slip is further based on a coefficient of friction learning threshold. In a fourth example that may include one or more of the first through third examples, the method includes where the adjusting the estimated coefficient of friction for the surface being traveled upon by the tire in response to an absence of wheel slip is further based on a relationship between the amount of time since a wheel most recently ceased slipping and a coefficient of friction learning rate.

Referring now to FIG. 3, a plot or an example relationship between a total accumulated amount of time since a most recent time that a wheel slipped (e.g., the wheel that is being used to estimate the mu value) to a coefficient of friction learning rate is represented via curve 302. The horizontal axis represents the total accumulated amount of time since the most recent time that the wheel slipped. The vertical axis represents the rate that the coefficient of friction for the surface that the wheel is traveling on. It may be observed that the learning rate increases with increasing elapsed time.

Turning now to FIG. 4, a sequence showing how the method of FIG. 2 may operate when a vehicle is traveling on a surface that may change to ice covered. The sequence of FIG. 4 may be provided by the system of FIG. 1 in cooperation with the method of FIG. 2.

The first plot from the top of FIG. 4 is a plot of estimated coefficient of friction (e.g., mu or mu_learn) for a surface on which a tire coupled to a wheel is traveling versus time. The vertical axis represents the value of mu and the value of mu increases in the direction of the vertical axis arrow. The horizontal axis represents time and time increases from the left side of the figure to the right side of the figure. Trace 402 represents the learned coefficient of friction for the surface that is being traveled upon (e.g., mu or mu_learn).

The second plot from the top of FIG. 4 is a plot of a mu learning trigger flag (e.g., a value of a variable that indicates a state of whether or not the coefficient of friction (mu or mu_learn) is being estimated when a wheel associated with a coefficient of friction of a surface that the wheel is traveling upon is not slipping) versus time. The vertical axis represents the operating state of the coefficient of friction (mu) learning trigger flag and mu learning for a non-slipping wheel is activated when trace 402 is at a higher level that is near the vertical axis arrow. Coefficient of friction (mu) learning for the non-slipping wheel is not activated when trace 402 is near the horizontal axis. The horizontal axis represents time and time increases from the left side of the figure to the right side of the figure. Trace 404 represents the state of the coefficient of friction (mu) learning flag.

At time t0, the mu estimate is a high value (e.g., 0.95 for a dry concrete surface) and coefficient of friction (mu) learning for a non-slipping wheel is activated. At time t1, the tire begins to pass over an icy surface and the coefficient of friction (mu) estimate for the surface being traveled upon begins to be reduced. This may occur when method 200 proceeds to step 204. Coefficient of friction learning for a non-slipping wheel is deactivated. The coefficient of friction (mu) value falls and then it levels out at a lower value near time t2.

At time t2, the wheel stops slipping and learning of the coefficient of friction for the surface that the wheel was formerly slipping on is activated or triggered for the now non-slipping wheel. Activating the coefficient of friction (mu) learning when the wheel is not slipping causes the coefficient of friction (mu) estimate to begin at the value of mu_learn_start and subsequently increase as shown between times t2 and t3 in the sequence. The driver demand torque between time t2 and time t3 may be a larger value, which may allow the value of mu_candidate to increase. Mu values generated during the interval between time t2 and time t3 may be realized in the method of FIG. 2 by proceeding from step 208 to step 210.

At time t3, the value of the coefficient of friction (mu) reaches the value of mu_learn_start plus mu_learn_max_lim (e.g., the offset value from the mu_learn_start value) so the value of the coefficient of friction for the surface being traveled on ceases increasing. Thus, learning the value of mu when the wheel in this example stops slipping begins from a low coefficient of friction (mu) value (e.g., when the wheel and tire are traveling on an icy surface). The driver demand torque between time t3 and t4 may be a smaller value, which may constrain increasing of the value of mu_candidate. Mu values generated during the interval between time t3 and time t4 may be realized in the method of FIG. 2 by proceeding from step 208 back to step 202.

At time t4, the driver demand torque is increased (not show), which allows the value of mu_candidate to increase and exceed the value of mu_learn–offset. Mu values generated during the interval after time t4 may be realized in the method of FIG. 2 by proceeding from step 206 to step 212.

Referring now to FIG. 5, a second sequence showing how the method of FIG. 2 may operate when a vehicle is traveling on a surface that has a relatively high coefficient of friction. The sequence of FIG. 5 may be provided by the system of FIG. 1 in cooperation with the method of FIG. 2.

The first plot from the top of FIG. 5 is a plot of estimated coefficient of friction (e.g., mu or mu_learn) for a surface on which a tire coupled to a wheel is traveling versus time. The vertical axis represents the value of mu and the value of mu increases in the direction of the vertical axis arrow. The horizontal axis represents time and time increases from the left side of the figure to the right side of the figure. Trace 502 represents the learned coefficient of friction for the surface that is being traveled upon (e.g., mu or mu_learn).

The second plot from the top of FIG. 5 is a plot of a mu learning trigger flag (e.g., a value of a variable that indicates a state of whether or not the coefficient of friction (mu or mu_learn) is being estimated when a wheel associated with a coefficient of friction of a surface that the wheel is traveling upon is not slipping) versus time. The vertical axis represents the operating state of the coefficient of friction (mu) learning trigger flag and coefficient of friction (mu) learning for a non-slipping wheel is activated when trace 402 is at a higher level that is near the vertical axis arrow.

Coefficient of friction (mu) learning for the non-slipping wheel is not activated when trace 502 is near the horizontal axis. The horizontal axis represents time and time increases from the left side of the figure to the right side of the figure. Trace 504 represents the state of the coefficient of friction (mu) learning flag.

At time t10, the mu estimate is a high value (e.g., 0.95 for a dry concrete surface) and coefficient of friction (mu) learning for a non-slipping wheel is activated. At time t11, the tire begins to pass over wet surface and the coefficient of friction (mu) estimate for the surface being traveled upon begins to be reduced and the mu learning trigger flag changes state from activated to not activated. The coefficient of friction (mu) value falls and then it levels out at a lower value near time t12.

At time t12, the wheel stops slipping and learning of the coefficient of friction for the surface that the wheel was formerly slipping on is activated or triggered for the now non-slipping wheel. Activating the coefficient of friction (mu) learning when the wheel is not slipping causes the coefficient of friction (mu) estimate to begin at the value of mu_learn_start and subsequently increase as shown between times t12 and t13 in the sequence. Mu values generated during the interval between time t12 and time t13 may be realized in the method of FIG. 2 by proceeding from step 208 to step 210.

At time t13, the value of the coefficient of friction (mu) reaches the maximum value for mu (e.g., max_mu with a value of 0.95) so the value of the coefficient of friction for the surface being traveled on ceases increasing. It may be observed that the value of mu_learn_start plus mu_learn_max_lim is greater than the maximum value for mu. As such, the mu estimate is constrained to the level of mu_max. Thus, learning the value of mu when the wheel in this example stops slipping begins from a higher coefficient of friction (mu) value (e.g., when the wheel and tire are traveling on a wet high friction surface).

Referring now to FIG. 6, a block diagram that shows how a coefficient of friction may be applied to operate a vehicle is shown. Block diagram 600 is a block diagram for a vehicle motion controller. In this example, a vehicle longitudinal stability control algorithm that is represented by block 602 outputs control parameters to a vehicle motion control routine that is represented by block 608. Similarly, a vehicle lateral and yaw controller represented by block 604 outputs control parameter to the vehicle motion control routine at block 608. Further, method 200 of FIG. 2, which is represented by block 606, provides an estimate of a coefficient of friction of a surface that a driven wheel (e.g., a wheel that is provided torque via a propulsion source) of the vehicle is traveling on to the vehicle motion controller at block 608.

The vehicle motion controller at block 608 considers the coefficient of friction of the surface that a driven wheel is traveling on, vehicle yaw rate, vehicle longitudinal and lateral rates of speed change, driver demand torque, and other control parameters to generate a wheel torque target for a wheel that is traveling on a surface for which the coefficient of friction is being determined. The target torque is output to actuator coordinator block 610. Actuator coordinator block 610 determines adjustments to actuators that may adjust wheel torque for the wheel that is traveling on the surface for which the coefficient of friction is being estimated. The actuator coordinator block 610 outputs commands to a propulsion source and wheel brakes to adjust wheel torque of the wheel that is traveling on the surface for which the coefficient of friction is being estimated.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other vehicle hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired. Empirically determined values may be determined by operating a vehicle and adjusting parameters under various operation conditions such that the vehicle behaves as may be desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for estimating a coefficient of friction for a surface being traveled upon by a tire, comprising:
   via a controller, adjusting the estimated coefficient of friction for the surface being traveled upon by the tire in response to an absence of wheel slip, where the adjusting is based on an amount of time since a wheel most recently ceased slipping; and adjusting wheel torque in response to the estimated coefficient of friction;

wherein the wheel torque is adjusted via adjusting output of a propulsion source.

2. The method for estimating the coefficient of friction for the surface of claim 1, where the adjusting is further based on a relationship between the amount of time since the wheel most recently ceased slipping and a predetermined coefficient of friction learning rate.

3. The method for estimating the coefficient of friction for the surface of claim 2, where the relationship between the amount of time since the wheel most recently ceased slipping and the predetermined coefficient of friction learning rate is determined via calibratable or learned values.

4. The method for estimating the coefficient of friction for the surface of claim 2, where adjusting the estimated coefficient of friction includes adjusting the estimated coefficient of friction from a value that is based on actual wheel torque, actual wheel rate of speed change, mass of a vehicle, a vehicle longitudinal rate of speed change, and a vehicle lateral rate of speed change.

5. The method for estimating the coefficient of friction for the surface of claim 4, further comprising adjusting the estimated coefficient of friction up to a value that is based on an offset value plus the value that is based on actual wheel torque, actual wheel rate of speed change, mass of the vehicle, the vehicle longitudinal rate of speed change, and the vehicle lateral rate of speed change.

6. The method for estimating the coefficient of friction for the surface of claim 4, further comprising adjusting the estimated coefficient of friction up to a maximum mu value.

7. The method for estimating the coefficient of friction for the surface of claim 1, where the amount of time since the wheel most recently ceased slipping is a basis for a learning rate for the estimated coefficient of friction.

8. A system for estimating a coefficient of friction for a surface being traveled upon by a vehicle, comprising:

a controller including executable instructions stored in non-transitory memory that cause the controller to adjust the estimated coefficient of friction for the surface being traveled upon by the vehicle in response to an actual total amount of time since a most recent wheel slip event; and adjusting wheel torque in response to the estimated coefficient of friction;

wherein the wheel torque is adjusted via adjusting output of a propulsion source.

9. The system of claim 8, further comprising additional executable instructions that cause the controller to adjust the estimated coefficient of friction in response to the most recent wheel slip event.

10. The system of claim 9, where the estimated coefficient of friction is adjusted based on an actual wheel torque, a rate of wheel speed change, vehicle longitudinal rate of speed change, vehicle lateral rate of speed change, vehicle mass, and a time interval between control routine execution cycles.

11. The system of claim 8, where the wheel torque is adjusted via adjusting a braking torque.

12. The system of claim 11, where the estimated coefficient of friction is increased at a predetermined rate.

13. A method for estimating a coefficient of friction for a surface being traveled upon by a tire, comprising:

via a controller, adjusting the estimated coefficient of friction for the surface being traveled upon by the tire in response to a wheel slip; and adjusting the estimated coefficient of friction for the surface being traveled upon by the tire in response to an absence of the wheel slip, where the coefficient of friction for the surface being traveled upon by the tire is adjusted in response to the absence of wheel slip is adjusted based on an amount of time since a wheel most recently ceased slipping; and adjusting wheel torque in response to the estimated coefficient of friction;

wherein the wheel torque is adjusted via adjusting output of a propulsion source.

14. The method of claim 13, where the estimated coefficient of friction for the surface being traveled upon by the tire in response to wheel slip is adjusted as a function of wheel torque, wheel rate of speed change, vehicle longitudinal rate of speed change, vehicle lateral rate of speed change, vehicle mass, and a time interval.

15. The method of claim 13, where the adjusting the estimated coefficient of friction for the surface being traveled upon by the tire in response to the absence of wheel slip is further based on a coefficient of friction learning threshold.

16. The method of claim 13, where the adjusting the estimated coefficient of friction for the surface being traveled upon by the tire in response to the absence of wheel slip is further based on a relationship between the amount of time since the wheel most recently ceased slipping and a coefficient of friction learning rate.

* * * * *